May 13, 1958 J. J. TOWNSLEY 2,834,517
ROTATING PROPELLANT TANK HAVING BAFFLE MEANS
FOR DIRECTING PROPELLANT TO OUTLETS
Filed March 15, 1954

INVENTOR.
JOHN J. TOWNSLEY
BY
ATTORNEYS

United States Patent Office 2,834,517
Patented May 13, 1958

2,834,517

ROTATING PROPELLANT TANK HAVING BAFFLE MEANS FOR DIRECTING PROPELLANT TO OUTLETS

John J. Townsley, Wharton, N. J., assignor, by mesne assignments, to the United States of America as represented by the Secretary of the Navy Application March 15, 1954, Serial No. 416,450

2 Claims. (Cl. 222—168)

This invention relates to the art of dispensing fluid from storage tanks and specifically to the art of dispensing propellant fluid from tanks to reaction motors on the tips of helicopter rotor blades.

The tank provided on aircraft for storing the fuel to be used during the flight of the aircraft is subject to forces in various directions. These forces may be vertical, horizontal or at some angle to either of these planes. They are due to the angle of flight of the craft, the tilt, acceleration or to gravitational effects. The effect of these forces may be to carry the propellant fuel away from all or some of the outlet ports of the tank thus reducing the fluid flow or the pressure below what it should be for proper functioning of the aircraft.

This problem is of particular importance in aircraft of the helicopter type which are capable of and often go through rather violent maneuvers. In helicopters which are powered by reaction motors on the tips of the rotor blades, the problem of supplying fuel to the motors which are themselves rotating is inherently difficult and the complication noted above is particularly troublesome.

This device is provided therefore to insure an adequate covering of the outlet ports of a propellant storage tank by the fluid contained in the tank.

It is an object of this invention to provide a tank holding fluid to be dispensed which is provided with means to insure an adequate flow of fluid from the tank.

Another object of this invention is to provide a dispensing tank which may be mounted for rotation and subjected to a variety of forces from different angles and will still deliver the substance being dispensed as required.

Still another object of this invention is to provide a tank to be mounted on an aircraft to hold propellant fluid and which is constructed to provide an adequate amount of propellant fluid regardless of the position of movement of the aircraft.

A further object of this invention is to provide a fuel tank for a helicopter adapted to be mounted on the rotor thereof to rotate therewith and provided with internal baffles to direct the flow of fluid therein toward the outlet ports and into the fuel distribution system of the craft.

Other objects and many of the attendant advantages of this invention will be readily appreciated as the same becomes better understood by reference to the following detailed description when considered in connection with the accompanying drawings wherein.

Figure 1:
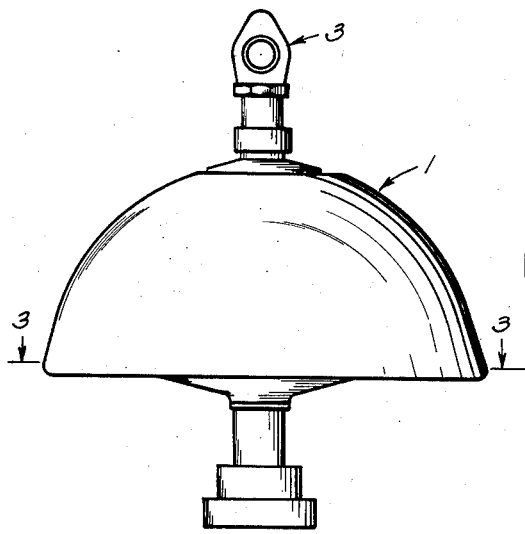
Figure 1 is a front view of the tank showing it assembled on a means mounting it for rotation.

As seen in Figure 1, a preferred form of the invention is a tank generally designated by the reference numeral 1 having substantially a hemispherical configuration. The tank is not limited to this shape and it is shown by way of example only. The center of the tank is formed by a sleeve 2 through which the means mounting the tank for rotation is passed. The means in this instance is designated by the reference numeral 3 and is designed to mount the tank on the rotors of a helicopter. Provided on the periphery of the tank are a plurality of outlets 4 which open into the fuel distribution system of the aircraft or into any system into which it is desired to have the substance in the tank dispensed. Extending radially from the sleeve 2 in the center of the tank and secured thereto and to the walls of the tank by any suitable means are a plurality of plates 5 forming baffles. These baffles divide the tank into compartments and are provided with a plurality of perforations 6 which perforations permit the fluid to pass from one compartment to another during rotations of the tank. The baffles 5 are bent at a point short of where they would contact the walls of the tank and then run along a path converging on the outlet ports 4.

The bent portions of the baffles form scoops 7. The scoops are bent toward the walls and contact the walls along the lines 8 and 9, running to a point on one side of an outlet 4. Thus the baffle acts to direct fluid toward the scoop 7 which serves to maintain a level of fluid covering the port at all times.

Additional baffles 10 extend from the center of the tank radially toward the walls. These baffles serve to provide strengthening means for the tank and also to aid in directing the fluid toward the ports. Perforations 11 in the baffles 10 permit fluid to flow from one compartment to the other.

Figure 2:
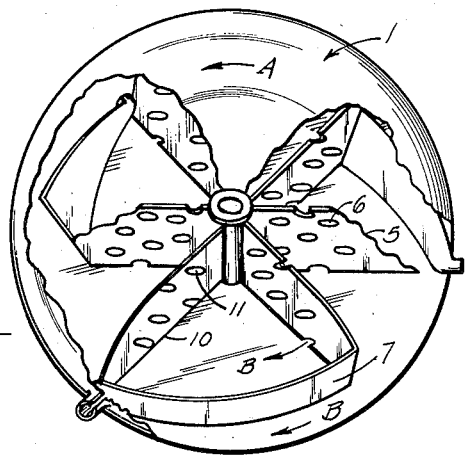
Figure 2 is an isometric view of the tank with portions of its walls cut away to show the internal construction.
Figure 3:
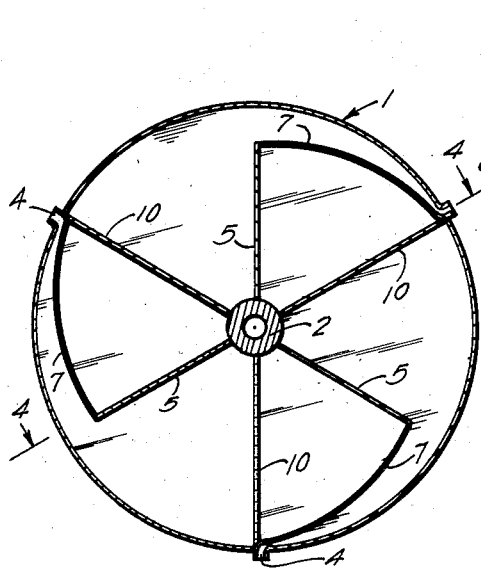
Figure 3 is a section along the line 3—3 in Figure 1 showing only elements of the tank.
Figure 4:
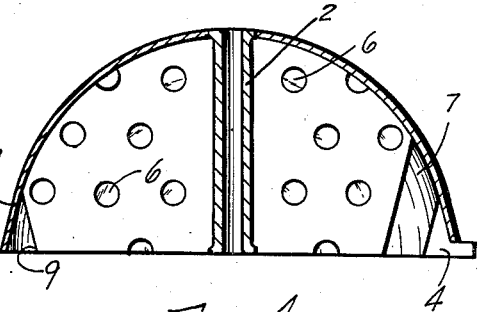
Figure 4 is a section along the line 4—4 in Figure 3.

In use the tank is mounted on a rotating means, this may be the rotor of a helicopter or it may be any rotating means, and the tank is rotated along with the means in the direction of the arrow A in Figure 2. The rotation of the tank in the direction of arrow A will cause the fluid to have relative rotation in the direction of the arrows B. The scoops 7 facing in the direction of rotation will trap the fluid as it is driven toward the walls by the centrifugal force of the rotation and force it to flow through the outlets 4. This will occur in spite of the effects of the other forces which may be acting on the tank tending to take the fluid away from the outlets or ports.

It is possible by proper design of the scoops 7 to induce an actual pressure rise in the fluid leaving the tank by creating a pumping effect.

It is obvious that this tank construction is not limited to use on a helicopter for it is possible to provide a tank rotating means and to utilize this invention wherever it is desired to have a constant flow of a material being dispensed.

Obviously many modifications and variations of the present invention are possible in the light of the above teachings. It is therefore to be understood that within the scope of the appended claims the invention may be practiced otherwise than as specifically described.

What is claimed is:

1. In a rotatable propellant tank, a series of baffles forming compartments, openings in said baffles to provide fluid communication between compartments, said baffles also being provided with imperforate walls which form end walls for said compartments and which also form, in combination with the wall of said tank, a series of passages, said tank having a plurality of outlet ports provided therein, said passages being directed toward said ports.

2. A propellant dispersing system for helicopters comprising a hollow tank having a circular base and hemispherical side walls, means mounting said tank on a helicopter rotor head for rotation therewith, a plurality of radially extending perforate baffle plates having edge portions secured to said baffle and said side walls, said baffle plates being arranged in pairs, one baffle of each pair extending to the circumferential edge of said circular base adjacent one of said outlets, the other of said pair of baffle plates terminating in a spiral imperforate end portion that is secured to the one baffle plate adjacent the circumferential edge of said circular base, and wherein the spiral section of said other baffle plate cooperates with the base and the side wall to funnel the propellant in said tank toward said one outlet.

References Cited in the file of this patent

UNITED STATES PATENTS

| | | |
|---|---|---|
| 788,972 | Weatherholt | May 2, 1905 |
| 1,383,354 | Wareing et al. | July 5, 1921 |
| 1,447,321 | Powell et al. | Mar. 6, 1923 |
| 1,979,621 | Hollander | Nov. 6, 1934 |
| 2,669,188 | McIntyre | Feb. 16, 1954 |
| 2,670,049 | Christie | Feb. 23, 1954 |